United States Patent
Mandyam

(10) Patent No.: US 6,999,535 B1
(45) Date of Patent: Feb. 14, 2006

(54) APPARATUS, AND ASSOCIATED METHOD, FOR RECOVERING A DESIRED COMPONENT OF A RECEIVE SIGNAL RECEIVED AT A RADIO DEVICE

(75) Inventor: Giridhar D. Mandyam, Dallas, TX (US)

(73) Assignee: Nokia Mobile Phones Limited, Espoo (FI)

( * ) Notice: Subject to any disclaimer, the term of this patent is extended or adjusted under 35 U.S.C. 154(b) by 621 days.

(21) Appl. No.: 09/580,861

(22) Filed: May 30, 2000

(51) Int. Cl.
*H03D 1/04* (2006.01)
*H03D 1/06* (2006.01)
*H03K 5/01* (2006.01)
*H03K 6/04* (2006.01)
*H04B 1/10* (2006.01)

(52) U.S. Cl. ................................................. 375/346

(58) Field of Classification Search .......... 375/149, 375/130, 324, 334, 346, 216, 371, 278, 293; 331/17; 348/475; 342/44

See application file for complete search history.

(56) References Cited

U.S. PATENT DOCUMENTS

| | | | | |
|---|---|---|---|---|
| 4,623,890 A | * | 11/1986 | Nysen | 342/44 |
| 4,864,221 A | * | 9/1989 | Fouche et al. | 324/76.77 |
| 5,208,451 A | * | 5/1993 | Deck | 250/201.3 |
| 5,633,895 A | * | 5/1997 | Powell et al. | 375/324 |
| 5,646,698 A | * | 7/1997 | Yang et al. | 348/475 |
| 5,748,045 A | * | 5/1998 | Tateishi | 331/17 |
| 6,160,857 A | * | 12/2000 | Yang | 375/334 |
| 6,314,129 B1 | * | 11/2001 | Sunwoo et al. | 375/149 |
| 6,510,175 B1 | * | 1/2003 | Hunsinger et al. | 375/216 |

* cited by examiner

*Primary Examiner*—Stephen Chin
*Assistant Examiner*—Curtis Odom
(74) *Attorney, Agent, or Firm*—Alston & Bird LLP

(57) ABSTRACT

Apparatus, and an associated method, facilitates recovery of the informational content of a desired component portion of a receive signal received at a radio device. Non-desired component portions of the receive signal, such as interfering components formed as a result of adjacent-band communications. Power-level zero crossings of the non-desired component portions of the receive signal are detected. The receive signal is then sampled at the times corresponding to the zero crossings of the non-desired component portions. The resultant, sampled signal formed from such sampling excludes thereby the non-desired component portion of the receive signal.

20 Claims, 3 Drawing Sheets

APPARATUS, AND ASSOCIATED METHOD, FOR RECOVERING A DESIRED COMPONENT OF A RECEIVE SIGNAL RECEIVED AT A RADIO DEVICE

The present invention relates generally to a manner by which to recover the desired component portion of a receive signal received at a radio device, such as a mobile station operable in a cellular communication system. More particularly, the present invention relates to apparatus, and an associated method, by which to exclude component portions of the receive signal, such as component portions formed as a result of adjacent-band interference, which interferes with the recovery of the desired component portion of the receive signal. The receive signal is sampled at power-level zero crossings of the interfering component portions of the receive signal. The sampled signal excludes, as a result, the interfering component portions of the receive signal. And, thereby, recovery of the desired component portion is facilitated.

BACKGROUND OF THE INVENTION

The use of multi-user, radio communication systems have achieved wide popularity in recent years as advancements in communication technologies have permitted the affordable utilization of such radio communication systems by large numbers of users.

The communication channel connecting a sending station with a receiving station in a radio communication system is formed of a radio communication channel. A radio communication channel is defined upon a portion of the electromagnetic spectrum. Because a radio communication channel is used to communicate communication signals between the sending and receiving stations, a conventional wireline connection, required by conventional wireline communication systems, is not required to interconnect the sending and receiving stations to permit the effectuation of communications therebetween. The use of a radio communication system to communicate therethrough is of particular advantage when formation of a wireline connection between sending and receiving stations would be inconvenient or impractical.

A sending station of a radio communication system is operable to convert information which is to be communicated to the receiving station into a communication signal of characteristics which permits its communication upon the radio communication channel. To convert the information into such a communication signal, the sending station modulates the information signal upon a carrier wave of a carrier frequency within the range of frequencies which defines, at least in part, the communication channel. A radio device which provides both a sending station and a receiving station at a common unit is sometimes referred to as a radio transceiver. Two-way communication is permitted through the use of a radio transceiver.

A cellular communication system is exemplary of a multi-user radio communication system, usage of which has achieved wide popularity in recent years. When a user communicates by way of a radio transceiver, typically referred to as a mobile station, the mobile station is constructed to mimic the operation of a conventional, wireline telephonic device. Because telephonic communication is effectuated without the need of a wireline connection with the mobile station, the mobile station can be utilized to effectuate telephonic communications from locations at which formation of a wireline connection would be inconvenient or impractical.

With advancements in digital communication techniques, cellular, as other radio, communication systems increasingly are implemented which make use of such techniques. And, while conventional, analog cellular communication systems have been installed over wide geographic areas, additional cellular communication systems, making use of digital communication techniques, have now also been installed over wide geographical areas. The geographical areas encompassed by conventional, analog cellular communication systems and the geographical areas encompassed by digital communication systems regularly overlap. A user is oftentimes provided thereby with a choice of communication systems within a geographical area by which to obtain a service subscription to communicate by way of a selected cellular communication system.

Cellular communication systems are allocated with portions of the electromagnetic spectrum upon which to define communication channels to permit effectuation of communications. Generally, even in communication systems which provide for both conventional, analog communications and also digital communications, certain portions of the allocated frequency spectrum, allocated to the communication system, are used to effectuate analog communications and other portions of the allocated spectrum are utilized for digital communications. And, separate communication systems are allocated separate portions of the electromagnetic frequency spectrum. That is to say, a first frequency band is allocated for use by a first cellular communication system, and a second frequency band is allocated for communications pursuant to a second cellular communication system. Such frequency bands are sometimes adjacent to one another.

For instance, some existing digital cellular communication systems utilize Code-Division, Multiple-Access (CDMA) technologies. Such systems are implemented over wide geographical areas. Other cellular communication systems, such as AMPS (Advanced Mobile Phone Service) and TDMA (Time-Division, Multiple-Access) cellular communication systems are also installed over wide geographical areas. The geographical areas over which CDMA and AMPs or TDMA systems are installed generally overlap, at least to some extent.

The frequency band allocated to a CDMA system is generally dissimilar with the frequency band allocated to an AMPS or TDMA system. But, signals generated during operation of the AMPS or TDMA communication system might form interference to interfere with communication of signals in the CDMA communication system. Even though signal energy generated during operation of the AMPS or TDMA system might well not include components which fall within the signal bandwidth of a CDMA signal generated during operation of the CDMA system, the signal energy forming the interference might be of characteristics close enough to the center frequency of the CDMA signal to distort the CDMA signal.

If the interference caused as a result of such adjacent-band signal generation is not properly accounted for, misoperation of the receiver portions of the mobile station which receives the CDMA signal might result. Namely, analog-to-digital converters forming a portion of the receive portion of a mobile station might saturate due to the relatively low resolution levels of the analog-to-digital converters typically utilized in such mobile stations.

A manner by which better to compensate for adjacent-band interference forming a portion of a receive signal received at a mobile station would better ensure acceptable operation of the mobile station.

It is in light of this background information related to operation of radio communication systems that the significant improvements of the present invention have evolved.

SUMMARY OF THE INVENTION

The present invention, accordingly, advantageously provides apparatus, and an associated method, by which to recover a desired component portion of a receive signal received at a radio device, such as a mobile station operable in a cellular communication system.

During operation of an embodiment of the present invention, the receive signal received at the radio device is sampled in a manner to exclude interfering component portions of the receive signal. Additional receiver operations are thereafter performed upon the sampled representation of the receive signal, thereby to recreate the desired component portion of the receive signal.

In one aspect of the present invention, the receive signal received at the radio device is down-converted in frequency from a RF (Radio Frequency) to a baseband level. The baseband signal is digitized by an analog-to-digital converter to form a digitized representation of the receive signal. A clock signal is provided to the analog-to-digital converter which digitizes the receive signal wherein the clock rate of the clock signal is at least as great as the characteristic frequency of the non-desired component portions of the receive signal. If, for instance, the non-desired component portion of the receive signal is formed of adjacent-band interference which interferes with a signal intended to be transmitted to the radio device upon a desired frequency band, the clock rate of the clock signal at which the analog-to-digital converter is clocked is at least as great as the characteristic frequency of the adjacent-band interference.

In another aspect of the present invention, a digitized representation of the receive signal is filtered to produce a filtered signal. The band pass filter is of characteristics to isolate a non-desired component portion of the receive signal. If, for instance, the desired component portion of the receive signal forms a CDMA (Code-Division, Multiple-Access) signal transmitted pursuant to a PCS cellular communication system, the pass band of the band pass filter is selected to not include the pass band of the PCS system, located in the United States at about 1.8 GHz. Thereby, the signal passed by the band pass filter includes the non-desired signal component portion of the receive signal, isolated from the desired component portion.

In another aspect of the present invention, the filtered signal formed by the band pass filter is provided to a zero-crossing detector. The zero-crossing detector is operable to detect occurrences of zero power levels of the filtered signal. Because the filtered signal is representative of, e.g., adjacent-band interference which exhibits a characteristic frequency, the occurrences of zero power levels of the filtered signal are cyclical. And, the zero-crossing detector detects occurrences of zero power levels of the filtered signal as the filtered signal passes from a negative value to a positive value, or, conversely, passes from a positive value to a negative value.

In another aspect of the present invention, a digitized representation of the receive signal is applied to a signal sampler. The signal sampler is caused to sample the digitized representation of the receive signal at sampling times corresponding to the occurrences of the zero-crossings of the non-desired component portion of the receive signal. By ensuring that the digitized representation of the receive signal is sampled only at the times at which the non-desired signal component portion thereof is of a zero value, the sampled signal formed therefrom does not include the non-desired signal component portion as a portion of the sampled signal. Thereby, subsequent signal recovery operations performed upon the sampled signal are able to be made without distortion introduced upon the desired component portion of the receive signal by the non-desired component portion.

In one implementation, a manner is provided for a mobile station operable in a cellular communication system to remove adjacent-band interference from a receive signal received at the mobile station, thereby to facilitate recovery of the informational content of the desired component portion of the receive signal. The receive signal detected at the mobile station is converted into electrical form and down-converted in frequency to a baseband frequency. The baseband signal is converted into digital form by an analog-to-digital converter which is clocked at clock rate at least as great as the frequency of interfering component portions of the receive signal. The digitized representation of the receive signal is then provided to both a band pass filter and to a delay element. The band pass filter to which the digitized representation of the receive signal is applied is operable to pass the non-desired component portion of the receive signal but not the desired component portion thereof. The non-desired signal component portion of the receive signal passed by the band pass filter exhibits a characteristic frequency. The filtered signal is applied to a zero-crossing detector which detects occurrences of power-level zero-crossings of the filtered signal. Because of the cyclic nature of the filtered signal, the occurrences of the zero-crossings are indicative of times at which the non-desired component portion of the receive signal does not distort the desired component portion of the receive signal. That is to say, because the power level is zero at the zero-crossings of the non-desired component portion, the receive signals at such occurrences correspond in value to the value of the desired component portion. The delay element to which the digitized representation of the receive signal is also applied delays the signal applied thereto by a delay period corresponding to the amount of time required for operation of the band pass filter and the zero-crossing detector. The digitized representation of the receive signal, together with indications of occurrences of zero crossings of the filtered signal formed by the band pass filter are together applied to a signal sampler. The signal sampler samples the digitized representation of the receive signal at sampling times corresponding to the zero crossings detected by the zero-crossing detector. A sampled signal is formed therefrom. The sampled signal is formed of sample points of the digitized representation of the receive signal at the zero crossings of the non-desired component portion of the receive signal. Thereby, the sampled signal does not include the non-desired component portions of the receive signal. Recreation of the informational content of the desired component portion pursuant to additional operation of the receive portion of the mobile station is thereby facilitated. Problems associated with conventional receiver apparatus, such as saturation of component portions thereof by large values of interfering signal component portions of the receive signal are thereby obviated.

In these and other aspects, therefore, apparatus, and an associated method, is provided for a radio device operable in a radio communication system at least to receive a receive signal. The receive signal is formed of a desired component transmitted to the radio device upon a desired receive band and at least potentially a non-desired component transmitted to the radio device upon an other-than-desired receive band. Recovery of the desired component of the receive signal is facilitated. A non-desired component indicia detector is coupled to receive indications of the receive signal. The non-desired component indicia detector detects an indicia of the non-desired component of the receive signal. A receive signal sampler is also coupled to receive indications of the receive signal as well as also to receive indications of the indicia of the non-desired component of the receive signal detected by the non-desired component indicia detector. The receive signal sampler samples the receive signal at sampling times responsive to the indicia detected by the non-desired component indicia detector. The receive signal, once sampled, is representative of the desired component of the receive signal.

A more complete appreciation of the present invention and the scope thereof can be obtained from the accompanying drawings which are briefly summarized below, the following detailed description of the presently preferred embodiments of the invention, and the appended claims.

DETAILED DESCRIPTION OF THE PREFERRED EMBODIMENT

Figure 1:
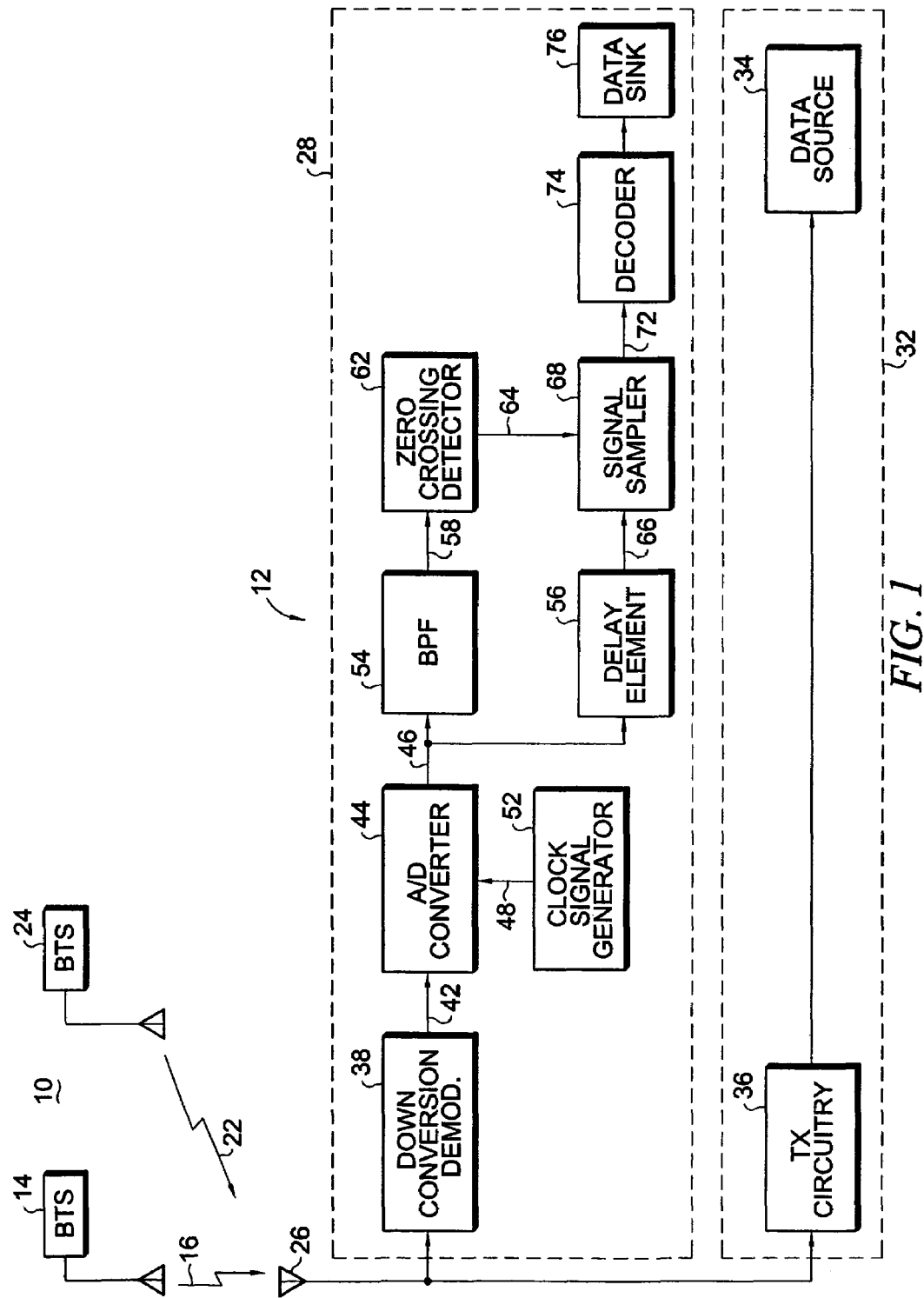
FIG. 1 illustrates a functional block diagram of a portion of a radio communication system including a mobile station having a receive portion operable pursuant to an embodiment of the present invention.

Referring first to FIG. 1, a radio communication system, shown generally at 10, is operable to provide for radio communications between a mobile station 12 and network infrastructure of which a Base Transceiver Station (BTS) forms a portion. Radio signals are communicated between the mobile station and the base transceiver station by way of a radio link, here shown at 16. Signals generated at the base transceiver station 14 for communication to the mobile station are sometimes referred to as being downlink signals transmitted upon downlink channels. And, signals generated at the mobile station for communication to the base transceiver station are sometimes referred to as being uplink signals transmitted upon uplink channels. In the exemplary embodiment, the communication system forms a CDMA (Code-Division, Multiple-Access) cellular communication system operable at a frequency band of approximately 1.8 GHz. While the following description shall, at times, describe operation of an embodiment of the present invention with respect to the exemplary implementation in a CDMA communication system, it should be understood that, in other implementations, an embodiment of the present invention is analogously operable, and such operation can analogously be described.

While downlink signals transmitted upon the radio link 16 formed between the mobile station and the base transceiver station 14 are intended, and during normal operation of the communication system are delivered, to the mobile station, the mobile station 12 might, at times, also receive signals generated upon adjacent-bands, adjacent to the frequency band allocated to the radio communication system. The adjacent-band communication signals might include, for instance, intermodulation products of communication signals having fundamental components communicated within the frequency band of the adjacent communication band. The signal actually received at the mobile station, in such instances, includes not only the downlink signal intended to be provided to the mobile station but also other signals, such as signals generated during operation of a communication system to which a frequency band adjacent to the frequency band allocated to the communication system 10 transmits communication signals. In the Figure, communication of the adjacent-band, or other, signals to the mobile station 12 are represented by the arrow 22. And, here, the signals are transmitted to the mobile station by a base transceiver station 24 operable in another radio communication system, such as a radio communication system overlayed upon the same geographical area upon which the communication system 10 is installed. The signals can, of course, be generated by other devices of such other radio communication system.

In any event, the receive signal received at the mobile station is potentially formed of both the intended downlink signal communicated by way of the radio link 16 as well as other signals, such as those represented at 22. The intended downlink signal forms a desired component portion of the receive signal received at the mobile station 12, and other signals received at the mobile station form non-desired component portions of the receive signal. The non-desired component portions of the receive signal form interference which interferes with, or otherwise distorts, proper recreation of the informational content of the intended downlink signal forming the desired component portion of the receive signal.

The receive signal communicated to the mobile station 12 in electromagnetic form and formed of one, or a plurality, of component portions, is detected at an antenna transducer 26. The antenna transducer is operable to convert the receive signal into electrical form and to provide the receive signal, in electrical form, to the receive portion 28 of the mobile station. The transducer is also coupled to a transmit portion 32 of the mobile station, here shown to include a data source 34 and transmit circuitry 36. Signals generated by the transmit portion of the mobile station are provided to the antenna transducer in electrical form, and the antenna transducer is operable to convert such signals into electromagnetic form for communication to, for instance, the base transceiver station 14.

The receive portion 28 of the mobile station is here shown to include down-conversion and demodulation circuitry 38 coupled to the antenna transducer to receive the receive signals once converted into electrical form by the antenna transducer. The circuitry 38 is operable to down-convert in frequency, from a radio frequency, here of approximately 1.8 GHz, to a baseband level and to demodulate the receive signal. A baseband signal is generated on the line 42 which is representative of the receive signal received at the antenna transducer. That is to say, the signal generated on the line 42 potentially includes both the desired component portion as well as one or more non-desired component portions.

The line 42 is coupled to an input of an analog-to-digital (A/D) converter 44. The converter 44 is operable to convert the representation of the receive signal generated on the line 42 into digital form on the line 46. That is to say, the A/D converter is operable to form a digital representation of the receive signal on the line 46.

The A/D converter 44 is coupled to receive a clock signal on the line 48 generated by a clock signal generator 52. The clock signal generator generates the clock signal at a clock rate at least as great as the frequency of the non-desired component portion of the receive signal and is, here, at least a multiple thereof. In conventional manner, the clock signal, when applied to the converter 44, controls the rate at which the digital samples of the analog signal applied to the converter are formed. At a sufficiently high clock rate, the digital representation of the receive signal includes all component portions of the receive signal.

The line 46 is coupled both to a band pass filter 54 and to a delay element 56. In the exemplary implementation, the band pass filter exhibits a pass band between 1.1 MHz and 1.4 MHz. The desired component portion of the receive signal is not within the pass band of the band pass filter 54. The filter forms a filtered signal on the line 56, thereby, which isolates the non-desired component portion of the digitized representation of the receive signal. The non-desired component portion of the receive signal exhibits a characteristic frequency and, thus, is cyclic in nature. Because of the cyclic nature of the non-desired component portion of the receive signal, the non-desired component portion exhibits occurrences of zero power levels. That is to say, the non-desired component portion exhibits power-level zero crossings as the component portion passes from a negative value to a positive value and from a positive value to a negative value.

The line 58 is coupled to a zero-crossing detector 62. The detector 62 is operable to detect occurrences of zero power-level values of the non-desired component portion of the receive signal, passed on the line 58 and provided to the detector 62. The detector 62 generates a signal on the line 64 at least indicative of the times of occurrences of the zero crossings.

The delay element 56 is operable to delay the digital representation of the receive signal applied thereto a delay period corresponding to the time period required of the band pass filter 54 and zero-crossing detector 62 to operate upon the digital representation of the receive signal. The delay element generates, on the line 66, a digital representation of the receive signal delayed by the suitable delay period.

The lines 64 and 66 are coupled to a signal sampler 68. The signal sampler is operable to sample the biggest representation of the receive signal at sampling times corresponding to the times at which the non-desired signal component portion of the receive signal exhibits a zero crossing. A sampled signal generated by the signal sampler on the line 72 is formed of sampled values taken at the sampling times by the sampler. Because the receive signal provided to the sampler on the line 66 is sampled at the zero crossings of the non-desired component portion of the receive signal, the sampled signal generated on the line 72 does not include the non-desired component portion of the receive signal. Thereby, distortions introduced upon the receive signal as a result of the non-desired component portions thereof are removed from the receive signal by the signal sampler. When applied to other portions of the receive portion 28 of the mobile station, recreation of the informational content of the desired component portion of the receive signal is facilitated.

The receive portion 28 is further shown to include a decoder 74 coupled to the line 72 to receive the sampled signal. The decoder is operable in conventional manner to decode the signal applied thereto and, thereafter, to provide the decoded signal to a data sink 76, such as a speaker element.

Figure 2:
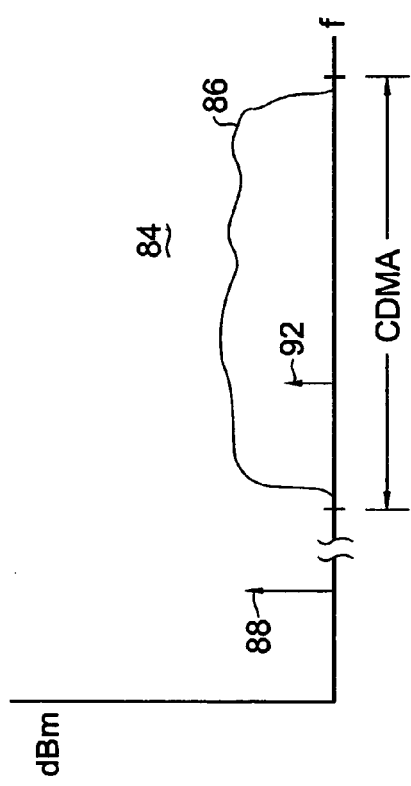
FIG. 2 illustrates a graphical representation, plotted as a function of frequency, of a receive signal received at the mobile station forming a portion of the radio communication shown in FIG. 1.

FIG. 2 illustrates an exemplary receive signal, shown generally at 84, representative of a receive signal received at the mobile station 12 (shown in FIG. 1) during operation of an embodiment of the present invention. The receive signal is plotted as a function of frequency and is shown to include a desired component portion 86 transmitted within a frequency band 88 allocated for a CDMA communication system. A non-desired component portion 88 together with an intermodulation product 92 thereof also are shown to form portions of the receive signal. During operation of an embodiment of the present, distortion of the desired component portion 86 which would otherwise result due to the presence of the non-desired component portions are removed, thereby to facilitate recreation of the informational content of the desired component 86.

Figure 3:
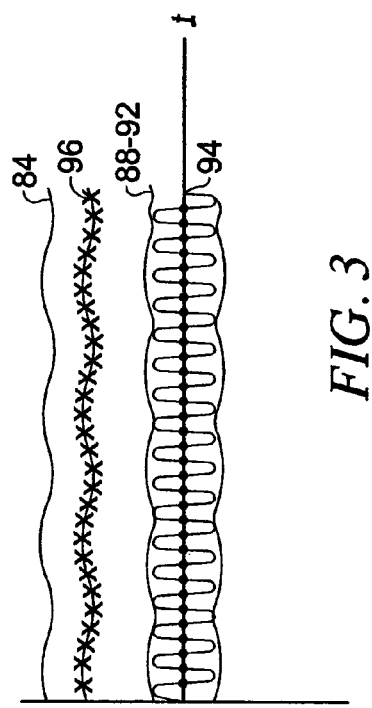
FIG. 3 illustrates another graphical representation, plotted as a function of time, of the receive signal received at the mobile station during operation of the radio communication system shown in FIG. 1.

FIG. 3 illustrates another representation of receive signal 84, here plotted as a function of time. The receive signal here defines an envelope, referenced with the common reference 84 formed of the summation of the desired component portion 86 and the non-desired component portion 88–92.

Zero crossings 94 of the non-desired component portions 88-92 of the receive signal are also noted in the Figure. Such zero crossings are detected by the zero-crossing detector 62 (shown in FIG. 1) during operation of an embodiment of the present invention. And, sampled portions 96, denoted by "x's" are made at the zero-crossings 94 of the non-desired component portions 88–92. Because the samplings are performed at zero-crossings, the sampled signal formed by the signal sampler 68 (shown in FIG. 1) is formed of components of only the desired component portion 86 of the receive signal.

Figure 4:
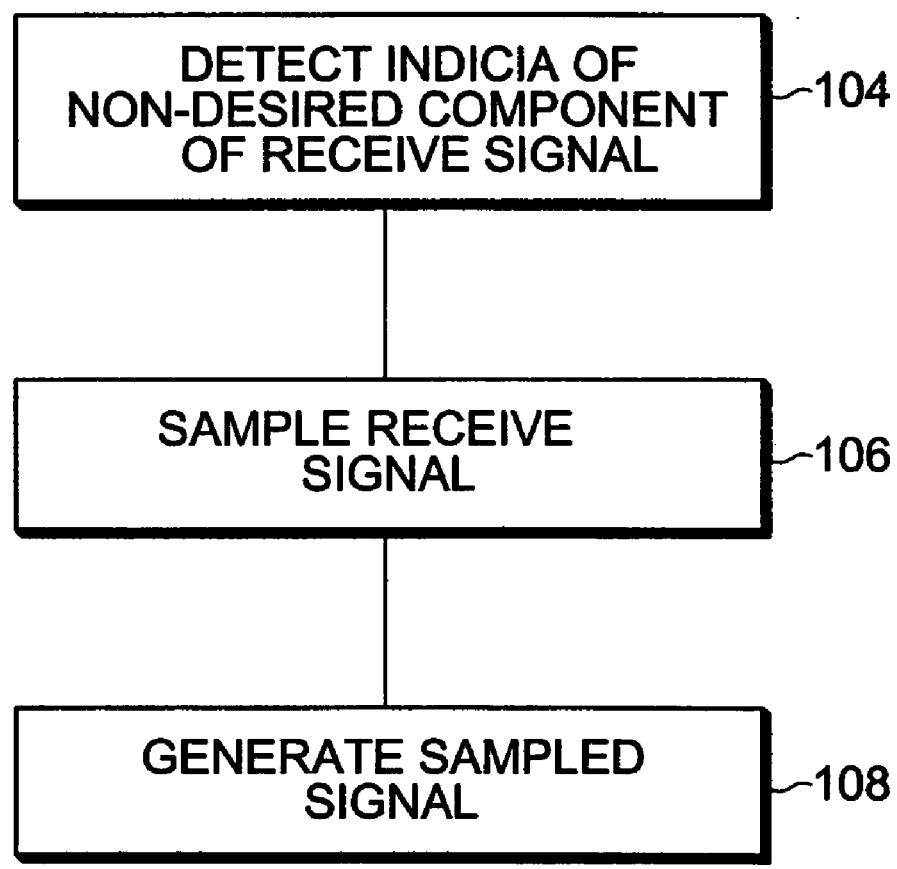
FIG. 4 illustrates a method flow diagram listing the method of operation of an embodiment of the present invention.

FIG. 4 illustrates a method, shown generally at 102, of an embodiment of the present invention. The method is operable to facilitate recovery of a desired component of a receive signal received at a radio device operable in a radio communication system. The receive signal includes the desired component and potentially also a non-desired component.

First, and as indicated by the block 104, an indicia of the non-desired component of the receive signal is detected. Then, and as indicated by the block 106, the receive signal is sampled at times responsive to the indicia of the non-desired component of the receive signal. And, as indicated by the block 108, a sampled signal is generated. The sampled signal is representative of the desired component of the receive signal.

Thereby, through operation of an embodiment of the present invention, non-desired component portions, such as interfering components caused by adjacent-band interference, which would otherwise interfere with recovery of the desired component portions of the receive signal are removed out of the receive signal. Thereby, recovery of the informational content of the desired component portion of the receive signal is facilitated.

The previous descriptions are of preferred examples for implementing the invention, and the scope of the invention should not necessarily be limited by this description. The scope of the present invention is defined by the following claims:

I claim:

1. Apparatus for a radio device operable at least to receive a receive signal, the receive signal formed of a desired component transmitted to the radio device upon a desired receive band of first frequencies and at least potentially a non-desired component transmitted to the radio device upon an other-than-desired receive band of second frequencies, the second frequencies dissimilar to the first frequencies, said apparatus for facilitating recovery of the desired component of the receive signal, said apparatus comprising:

a non-desired component indicia detector adapted to receive indications of the receive signal that contains the desired component and at least potentially the non-desired component, said non-desired component indicia detector configured to detect an indicia of the non-desired component transmitted upon the other-than-desired receive band of the second frequencies of the receive signal, and for forming a detection signal indicative of the non-desired component of the receive signal, free of indications of the desired component transmitted upon the desired receive band of the first frequencies;

a receive signal sampler also adapted to receive the indications of the receive signal and adapted to receive the detection signal formed by said non-desired component indicia detector responsive to detection of the indications of the indicia of the non-desired component of the receive signal detected by said non-desired component indicia detector, said receive signal sampler configured to sample the receive signal at sampling times selected responsive to the indicia detected by said non-desired component indicia detector and to form a sampled signal, the sampled signal formed of signal samples, the signal samples free of the non-desired component transmitted upon the other-than-desired receive band of the second frequencies through appropriate selection of sampling times at which the indications of the receive signal are sampled, the receive signal once sampled, representative of the desired component transmitted upon the desired frequency band of the first frequencies of the receive signal.

2. The apparatus of claim 1 wherein the non-desired component of the receive signal exhibits a characteristic frequency within the second frequencies of the other-than-desired receive band, represented by a waveform having power-level zero-crossings, and wherein the indicia detected by said non-desired component indicia detector comprises indications of occurrences of the zero-crossings of the non-desired component of the zero-crossings.

3. The apparatus of claim 2 wherein said non-desired component indicia detector comprises a zero-crossing detector, said zero-crossing detector for detecting times at which the non-desired component of the receive signal crosses a zero power level and for forming signal crossing indications responsive thereto.

4. The apparatus of claim 3 further comprising a filter element positioned in-line with said zero-crossing detector, said filter element for forming a filtered signal, the filtered signal forming the indications of the receive signal to which said zero-crossing detector is coupled to receive.

5. The apparatus of claim 4 further comprising a digitizer positioned in-line with said filter element and coupled to receive representations of the receive signal, said digitizer for digitizing the representations of the receive signal, digitized representations formed therefrom applied to said filter element.

6. The apparatus of claim 5 wherein the indications of the receive signal of which said receive signal sampler is coupled to receive comprise the digitized representations of the receive signal.

7. The apparatus of claim 6 further comprising a delay element positioned in-line between said digitizer and said receive signal sampler, said delay element for delaying application of the digitized representation of the receive signal to said receive signal sampler for a selected time period.

8. The apparatus of claim 7 wherein the selected time period during which said delay element delays the digitized representation of the receive signal substantially corresponds to a time period required by said filter element to form the filtered signal.

9. The apparatus of claim 5 further comprising a clock signal generator coupled to said digitizer, said clock signal generator for generating a clock signal of a clock rate responsive to which said digitizer digitizes the representation of the receive signal.

10. The apparatus of claim 9 wherein the clock rate of the clock signal generated by said clock signal generator is greater than the characteristic frequency of the non-desired component of the receive signal.

11. The apparatus of claim 1 wherein the desired component of the receive signal comprises a transmit signal intended to be transmitted to the radio device, wherein the non-desired component comprises an adjacent-channel identifying signal and wherein the receive signal, once sampled by said receive signal sampler, is formed of sampled portions of the transmit signal.

12. The apparatus of claim 11 wherein the radio communication system comprises CDMA (Code-Division, Multiple-Access) cellular communication system, wherein the desired receive band comprises a CDMA receive band allocated to the CDMA cellular communication system for communication thereon of code-division multiplexed signals, and wherein the receive signal, once sampled by said receive signal sampler, is representative of a code-division multiplexed signal transmitted to the radio device.

13. The apparatus of claim 12 wherein the radio device comprises a cellular mobile terminal having a transmit portion and a receive portion, and wherein said non-desired component indicia detector and said receive signal sampler comprise portions of the receive portion of the cellular mobile terminal.

14. A method for communicating by way of a radio device operable at least to receive a receive signal, the receive signal formed of a desired component transmitted to the radio device upon a desired receive band of first frequencies and at least potentially a non-desired component transmitted to the radio device upon an other-than-desired receive band of second frequencies, the second frequencies dissimilar to the first frequencies, said method for facilitating recovery of the desired component of the receive signal, said method comprising the operations of:

receiving at the radio device the receive signal that contains both the desired component transmitted upon the desired receive band of the first frequencies and at least potentially the non-desired component transmitted upon the other-than-desired receive band of the second frequencies;

detecting at the radio device an indicia of the non-desired component of the receive signal received at the radio device, the indicia free of indications of the desired component of the receive signal transmitted upon the desired frequency band of the first frequencies;

sampling the receive signal at sampling times responsive to the indicia detected during said operation of detecting, the sampling times selected to correspond to times at which the non-desired component of the receive signal is of zero power level magnitudes; and forming a sampled signal responsive to sampling performed during said operation of sampling, the sampled signal representative of the desired component of the receive signal and free of the non-desired component.

15. The method of claim 14 wherein the indicia of the non-desired component of the receive signal comprises indications of occurrences of power-level zero-crossings of the non-desired component of the receive signal.

16. The method of claim 15 comprising the additional operation prior to the operation of detecting, of filtering representations of the receive signal received at the radio device, and wherein said operation of detecting is performed upon the representations of the receive signal subsequent to filtering thereof during said operation of filtering.

17. The method of claim 16 wherein the receive signal is sampled during the operation of sampling at times corresponding to occurrences of power-level zero crossings detected during said operation of detecting.

18. The method of claim 17 comprising the additional operation, prior to said operation of filtering, of digitizing the receive signal to form a digitized representation thereof.

19. The method of claim 18 wherein the receive signal digitized during the operation of digitizing is digitized at a rate at least as great as a characteristic frequency exhibited by the non-desired component of the receive signal.

20. Apparatus for a radio device operable in a radio communication system at least to receive a receive signal, the receive signal formed of a desired component transmitted to the radio device upon a desired receive band of first frequencies and at least potentially a non-desired component transmitted to the radio device upon an other-than-desired receive band of second frequencies, the second frequencies dissimilar to the first frequencies, said apparatus comprising:

a non-desired component indicia detector coupled to receive indications of the receive signal that contains the desired component and at least potentially the non-desired component, said non-desired component indicia detector for detecting an indicia of the non-desired component transmitted upon the other-than-desired receive band of the second frequencies of the receive signal, irrespective of power levels of the non-desired component and for forming a detection signal indicative of the non-desired component, free of indications of the desired component transmitted upon the desired receive band of the first frequencies;

a receive signal sampler also coupled to receive indications of the receive signal and coupled to receive the detection signal formed by said non-desired component indicia detector responsive to detection of the indications of the indicia of the non-desired component of the receive signal detected by said non-desired component indicia detector, said receive signal sampler for sampling the receive signal at sampling times responsive to the indicia detected by said non-desired component indicia detector and to form a sampled signal, the sampled signal formed of signal samples, the signal samples free of the non-desired component through appropriate selection of sampling times at which the indications of the receive signal are sampled, the receive signal once sampled, representative of the desired component of the receive signal.

\* \* \* \* \*